United States Patent [19]

Mutou

[11] 4,110,888

[45] Sep. 5, 1978

[54] GAS CHAMBER FORMING METHOD IN CLOSED CYLINDER OF GAS ENCLOSED TYPE

[75] Inventor: Toshiaki Mutou, Kamakura, Japan

[73] Assignee: Tokico Ltd., Kawasaki, Japan

[21] Appl. No.: 815,419

[22] Filed: Jul. 13, 1977

[30] Foreign Application Priority Data

Jul. 20, 1976 [JP] Japan .................. 51/86395

[51] Int. Cl.$^2$ .......................................... B23Q 17/00
[52] U.S. Cl. ........................................ 29/404; 29/434; 29/517
[58] Field of Search ............... 29/404, 516, 517, 434; 188/314, 322

[56] References Cited

U.S. PATENT DOCUMENTS

| 2,867,298 | 1/1959 | Roder | 188/314 X |
| 3,125,493 | 3/1964 | D'Amore | 29/434 X |
| 3,163,262 | 12/1964 | Allinguant | 29/517 UX |
| 3,762,514 | 10/1973 | Freitag | 188/314 X |
| 3,788,433 | 1/1974 | Katsumori | 188/314 |
| 3,801,087 | 4/1974 | Akaike et al. | 29/517 UX |
| 3,883,942 | 5/1975 | Fichter, Jr. et al. | 29/517 X |

*Primary Examiner*—Leon Gilden

[57] ABSTRACT

A gas chamber forming method in a cylinder of gas enclosed type such as hydropneumatic shock absorber or gas spring having high pressure gas enclosed therein. The method comprises steps of inserting a free piston slidably in the cylinder, disposing a stopper having a passage communicating the opposite sides thereof so as to abut with the free piston at one side thereof remote from a closed end of the cylinder, pushing the stopper and the free piston toward the closed end of the cylinder thereby elevating pressure of the gas confined between the free piston and the closed end of the cylinder to a predetermined level, securing the stopper relative to the cylinder, and thereafter, closing an open end of the cylinder.

4 Claims, 6 Drawing Figures

GAS CHAMBER FORMING METHOD IN CLOSED CYLINDER OF GAS ENCLOSED TYPE

BACKGROUND OF THE INVENTION:

This invention relates to a method for forming a gas chamber containing pressurized gas therein in a closed-type container such as a hydropneumatic shock absorber or a gas spring.

It is publicly known to introduce pressurized gas into a closed-type container such as a hydropneumatic shock absorber or a gas spring by forming a small hole or an orifice in the wall or the container, introducing pressurized gas into the container through the orifice, and closing the orifice permanently by welding or the like with or without inserting a closure member such as plug or pin into the orifice. Such method is described in, for example, British Pat. No. 996356 or U.S. Pat. No. 3,081,587. However, such prior art methods have shortcomings that it is troublesome and expensive to form gas filling orifice in the wall of the container and to perform gas filling operation after assembling operation, further, the equipment for performing the method is complicated and expensive.

SUMMARY OF THE INVENTION

An object of the present invention is to overcome shortcomings described heretofore, and according to the present invention, there provided a novel method for forming a gas chamber in a closed-type container such as hydropneumatic shock absorber or a gas spring of the type including a free piston slidably disposed in a bore to define the gas chamber between a closed end of the bore and one side of the free piston.

Some embodiments of the present invention will be described in detail with reference to the accompanying drawings.

Figure 1:
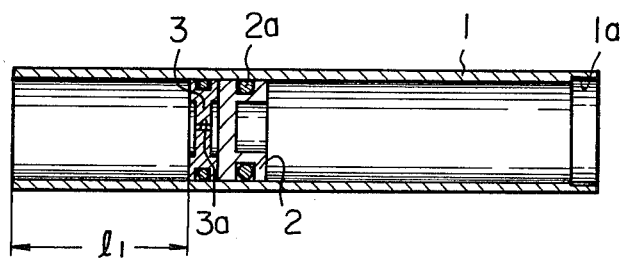
FIG. 1 through FIG. 4 are longitudinal cross sectional views illustrating respectively different stages of gas chamber forming method applied on a hydropneumatic shock absorber according to the present invention.

DESCRIPTION OF THE PREFERRED EMBODIMENTS:

In FIG. 1 a cylinder 1 having two open ends receives slidably therein a free piston 2 having an O-ring 2a in the outer periphery thereof for engaging with the inner periphery of the cylinder 1 sealingly and slidably. A stopper 3 having a through hole 3a acting as a passage connecting opposite sides of the stopper is received in the cylinder 1 to abut with the free piston 2, whereby the free piston 2 is located in the cylinder 1 at a predetermined position in the clyinder 1.

Figure 2:
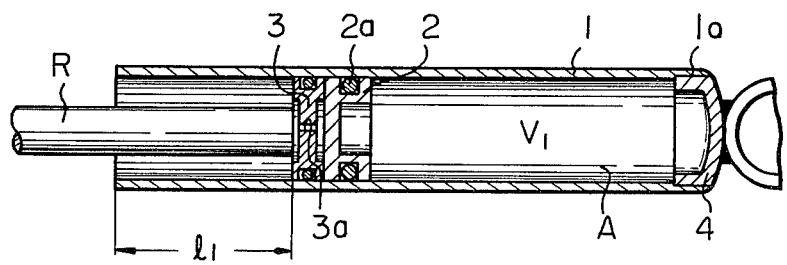

Then, a cap 4 is secured to one end 1a of the cylinder 1 at the side of the free piston 2 by welding or the like to form a closed chamber A in the cylinder 1 between the cap 4 and the free piston 2, as shown in FIG. 2. In performing this step, the stopper 3 and the free piston 2 are maintained to the predetermined position by, if necessary, inserting a push rod R or the like into the cylinder as shown in the drawing.

Next, the stopper 3 and the free piston 2 are moved inwardly toward the cap 4 by utilizing the push rod R such that the volume of the gas chamber A decreases thereby increasing pressure in the chamber A. When pressure in the chamber A increases to a predetermined pressure, the wall of the cylinder 1 is deformed radially inwardly to form a projection 1b with a suitable configuration for securing the stopper 3 in the cylinder 1. The projection 1b may be formed as an annular projection or as a plurality of angularly spaced projections. The stopper 3 acts to limit the leftward movement of the free piston 2 as viewed in FIG. 3 thereby limiting the maximum volume of the gas chamber A.

Figure 4:
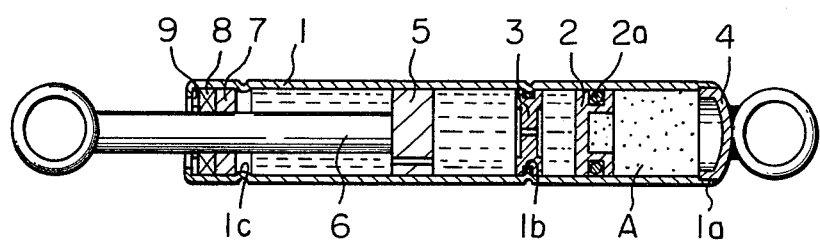

Thereafter, as shown in FIG. 4, a hydropneumatic shock absorber is assembled by introducing hydraulic fluid into the cylinder 1 through the open end thereof, inserting a piston 5 with a piston rod 6 secured thereto into the cylinder 1, closing the open end of the cylinder 1 and attaching a suitable fitting on the projecting end of the piston rod 6. In closing the open end of the cylinder 1, a rod guide 7, an oil seal 8 and a washer 9 are inserted into the cylinder 1 around the piston rod 6, and thereafter, the open end of the cylinder 1 is deformed radially inwardly to engage with the washer 9, and an annular projection 1c is formed in the wall of the cylinder 1 to retain the rod guide 7 in its position. It will be noted that the shock absorber shown in FIG. 4 is in its mid-stroke position and the free piston 2 is moved inwardly to compensate ingress of the piston rod 6 into the cylinder 1. Incidentally, the piston 5 and the piston rod 6 may be used as the push rod R in the preceding steps.

Figure 3:
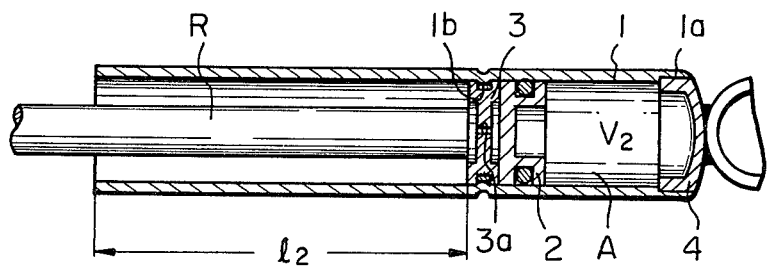

Assuming that the initial volume of the chamber A as defined in the step of FIG. 2 is $V_1$ and the initial pressure in the chamber A is $P_1$, (when this step is performed in atmospheric pressure, then, $P_1 = 1$), then, the desired pressure $P_2$ in the chamber A can be obtained from the equation:

$$P_2 = V_1 P_1 / V_2,$$

wherein $V_2$ is the volume of the chamber A at the condition of FIG. 3. As shown in FIGS. 2 and 3, the volumes $V_1$ and $V_2$ correspond directly with the length $l_1$ and $l_2$, thus, it is easy to determine the volume $V_2$ and pressure $P_2$ of the gas chamber A by determining the length $l_1$ and $l_2$ suitably.

Figure 5:
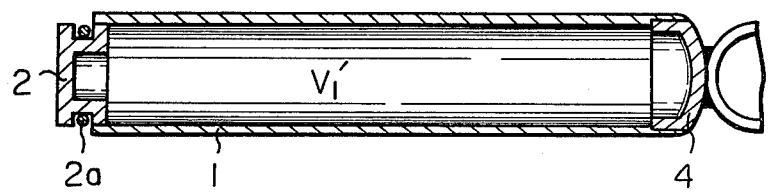
FIGS. 5 and 6 are longitudinal cross-sectional views illustrating modified form of the present invention.
Figure 6:
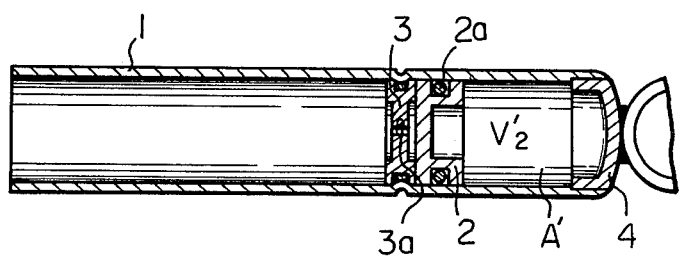

FIGS. 5 and 6 illustrate another embodiment of the present invention, and parts corresponding to the first embodiments are denoted by similar numerals. As shown in FIG. 5, one open end of the cylinder 1 is firstly closed by cap 4, thereafter, piston 2 and stopper 3 are inserted through another (open) end of the cylinder 1 and are pushed into the cylinder 1 by utilizing a suitable push rod or the like (not shown), and after the piston 2 and the stopper 3a are located at desired position such that the volume $V_2'$ or pressure in the gas chamber A' reaches to a predetermined level, suitable projection is formed radially inwardly of the cylinder 1 to retain the stopper 3 in its position, as shown in FIG. 6. The shock absorber assembled finally according to the second embodiment is illustrated in FIG. 4.

As described above, it is possible, according to the present invention, to form easily and economically pressurized gas enclosed shock absorber without utilizing any source of pressurized gas, without forming any pressurized gas filling passage or orifice in the wall of the cylinder or in the cap member, omitting welding operation which has been required in prior art method after pressurized gas has been filled into the cylinder.

Further, it is not necessary to use complicated and expensive gas filling equipment.

I claim:

1. A method for forming a gas chamber in a cylinder of gas enclosed type comprising the steps of inserting a free piston slidably into the cylinder, inserting a stopper having a through hole therein into the cylinder through an open end of the cylinder so as to abut with the free piston, pushing the stopper and the free piston further into the cylinder toward a closed end thereof, securing the stopper with respect to the inner wall of the cylinder when pressure of gas confined between the closed end of the cylinder and the free piston has been increased to a predetermined level, and thereafter, closing the open end of the cylinder.

2. A gas chamber forming method as set forth in claim 1, wherein the closed end of the cylinder is formed after the free piston has been inserted into the cylinder and located at a predetermined position.

3. A gas chamber forming method as set forth in claim 1, wherein the free piston is inserted into the cylinder after one end of the cylinder has been closed permanently.

4. A gas chamber forming method as set forth in claim 1, wherein the stopper is secured to the cylinder by forming a radially projecting projection on the inner periphery of the cylinder.

* * * * *